United States Patent [19]

Wietersen

[11] Patent Number: 5,213,194
[45] Date of Patent: May 25, 1993

[54] METHOD AND APPARATUS FOR LOADING A COLLAPSIBLE CONVEYOR BELT SYSTEM

[75] Inventor: Fred L. Wietersen, Maple Glen, Pa.
[73] Assignee: Proctor & Schwartz, Horsham, Pa.
[21] Appl. No.: 906,660
[22] Filed: Jun. 30, 1992
[51] Int. Cl.$^5$ .............................................. B65G 47/26
[52] U.S. Cl. ................................... 198/434; 198/459; 198/778; 198/831
[58] Field of Search ............... 198/434, 457, 459, 778, 198/831; 68/381

[56] References Cited

U.S. PATENT DOCUMENTS

| | | | |
|---|---|---|---|
| 1,489,926 | 4/1924 | Burtchaell . | |
| 2,278,361 | 3/1942 | Rapisarda | 198/831 |
| 2,683,523 | 7/1954 | Rottersmann | 198/778 |
| 2,758,391 | 8/1956 | Lanham | 198/778 |
| 2,918,729 | 12/1959 | Rayner | 198/778 |
| 3,240,316 | 3/1966 | Huffman et al. . | |
| 3,865,227 | 2/1975 | Kaak | 198/778 |
| 3,938,651 | 2/1976 | Alfred et al. . | |
| 4,203,512 | 5/1980 | Ammeraal | 198/778 |
| 4,613,037 | 9/1986 | Park et al. | 198/778 |

FOREIGN PATENT DOCUMENTS 2544916 2/1981 Fed. Rep. of Germany .

OTHER PUBLICATIONS

Proctor brochure No. 612/90 entitled "Superior taste, texture, appearance . . . ", Proctor and Schwartz, Inc., 6 pages.

Primary Examiner—Joseph E. Valenza
Attorney, Agent, or Firm—Howson and Howson

[57] ABSTRACT

Method and apparatus for maximizing the loading of streams of products on a collapsible conveyor belt which pass through a processor in helical paths. In one embodiment, a separate infeed belt is curved in the same direction and radius as the collapsible belt for loading the products at equally spaced intervals thereon. In another embodiment, the products in each path are deposited at intervals determined as a function of belt speed, load density and the ratio of the radius of each path to the radius at the periphery of the collapsible belt in the processor.

16 Claims, 2 Drawing Sheets

METHOD AND APPARATUS FOR LOADING A COLLAPSIBLE CONVEYOR BELT SYSTEM

BACKGROUND OF THE INVENTION

The present invention relates generally to improvements in conveyor systems, and more particularly to method and apparatus for high density loading of products on an endless collapsible conveyor belt.

Conventional helical or so-called "spiral" cooking, cooling and freezing processors typically include an endless collapsible conveyor belt of self-adjusting, intermeshing links which enable the belt to curve or "collapse" laterally from the path of a straight infeed section into a helical processing section within a chamber. Products can be loaded directly onto the infeed section or indirectly by a separate straight infeed belt traveling at the same linear speed as the infeed section of the collapsible belt. If the feed rate is manageable for manual loading, persons on either side of the infeed section or infeed belt, instinctively place the products at substantially equally spaced lengthwise intervals on the traveling belt. For machine or automatic loading and similar dispensing devices, the products are deposited across the infeed section or infeed belt in equally spaced rows like soldiers in marching formation. However, the lengthwise spacing between the articles decreases as the belt collapses into the helical section within the chamber regardless of how the products are arranged. The space loss is greatest near the inside edge of the collapsed belt and is usually compensated by loading all of the articles on the straight infeed section farther apart. Consequently, the load capacity of the belt is not fully utilized because products nearer to the outer edge have been spaced apart more than necessary.

Helical processors having a separate straight infeed belt feeding the products onto the infeed section of the collapsible belt are especially useful in processing delicate products which might deform if they were loaded on a straight section of belt that collapses into a helix during the process. But contrary to all appearances, there is no enhancement of load capacity of the belt because the tangential velocity in paths of products nearer to the outer edge of the helical belt is greater than the linear velocity of the infeed belt, i.e. there is excess space between products deposited in paths nearer to the outer edge.

SUMMARY OF THE INVENTION

Accordingly, it is an object of the present invention to provide a novel and improved method and apparatus for enhancing the load capacity of an endless collapsible belt in a conveyor system.

Another object is to provide a method and apparatus suitable for loading articles on a collapsible conveyor belt at predetermined intervals whereby the articles can travel along curved paths of a processing zone at minimally allowable intervals.

Still another object is to provide a method and apparatus suitable for manually loading articles on an endless collapsible conveyor belt at equal intervals which are replicated as they pass through a helical processor.

Another object of the invention is to provide a method and apparatus for dispensing articles at predetermined intervals on an endless collapsible conveyor belt in which the articles pass through a processor in curved paths at equally spaced intervals.

A further object of the invention is to provide a method of loading articles on a collapsible conveyor belt which enables full utilization of the belt loading capacity as it passes in a curved path through a processor.

A still further object of the invention is to provide a method and apparatus which enables the surface of a collapsible belt to be fully utilized in a helical processor.

Another object of the invention is to provide a high density loading method and apparatus in a conveyor system suitable for use in existing helical type conveyor systems.

These and other objects of the invention are accomplished by regulating the spacing between articles loaded on an infeed section of an endless conveyor belt which is collapsible laterally from its path of travel. The articles are thereby uniformly spaced as the belt travels through a processing chamber along a curved path. In one embodiment, particularly suitable for use in a manually loaded processing system, a separate infeed belt is curved in its plane of travel for receiving the articles at equal lengthwise intervals of space. The belt curves in a direction and an amount corresponding to the maximum curvature of a belt which passes through the processing chamber. In another embodiment, suitable for automatic loading, the articles are deposited on the infeed section of a collapsible belt at different intervals determined as a function of the radius of the belt at its maximum curvature in the processing chamber.

BRIEF DESCRIPTION OF THE DRAWINGS

For a better understand of these and other objects and aspects of the invention, reference will be made to the following detailed description taken in conjunction with the accompanying drawings, wherein.

DESCRIPTION OF THE PREFERRED EMBODIMENT

Figure 1:
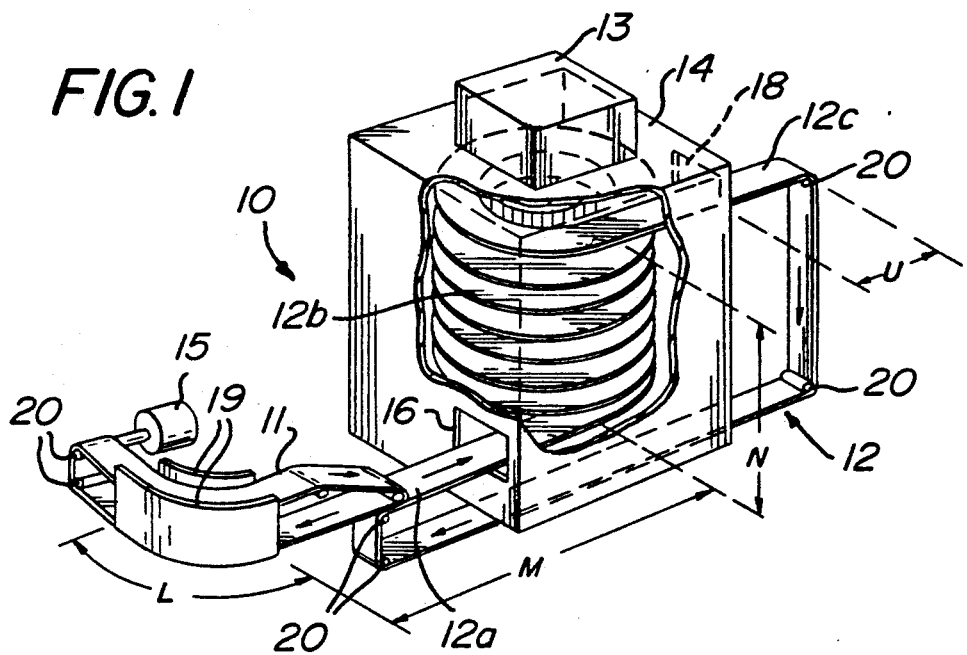
FIG. 1 is a schematic view in perspective of one embodiment of a helical conveyor system according to the invention with a collapsible belt and a separate infeed belt for manually loading products in a processor.

Referring now to the drawings wherein like reference characters denote like or corresponding parts throughout the several views, FIG. 1 illustrates a processing system 10 comprising an endless infeed belt 11 and an endless collapsible conveyor belt 12 for conveying manually loaded products through a processing chamber 14 in a direction indicated by the arrows. Belt 11 passes through an arcuate loading zone L between guide rails 19 to a straight infeed zone M where it gradually slopes downward to overlap in close proximity with a straight infeed section 12a of belt 12 traveling at the same speed as belt 11 to provide a smooth transfer of the products without disturbing their positions relative to each other. Belts 11 and 12 are synchronized to run at the same speed by motors 13 and 15. Of course, other means for synchronizing the speeds are contemplated, such as by a direct mechanical link between belts 11 and 12. In addition, conveyor system 10 may consist of only one collapsible belt such as described herein below with reference to the embodiment of FIG. 3.

Belt 12 enters chamber 14 through an opening 16, slopes upwardly to form a helical section 12b through a processing zone N. A straight exit section 12c of belt 12 leaves through an opening 18 to an off-load zone U. Belts 11 and 12 return by guide rollers 20 to loading zone L and infeed zone M, respectively, along any convenient paths, such as illustrated. Except for the direction of curvature, the path of belt 12 through zone N may also vary to meet specific design limitations and requirements of chamber 14. For example, the path may be an elliptical helix, or an arcuate segment.

Figure 2:
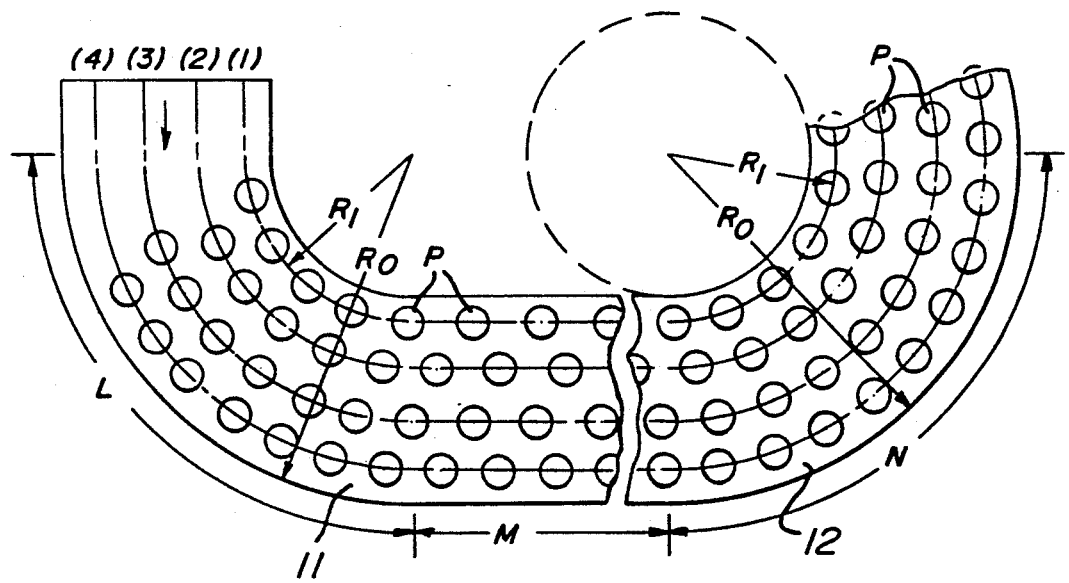
FIG. 2 is a plan view of fragmentary portions of the collapsible and infeed belts of FIG. 1 in different zones of the conveyor system with products placed according to the invention.

Referring to FIG. 2, belts 11 and 12 collapse within curved loading and processing zones L and N. Zone L curves laterally in the same direction and with the same outer radius $R_o$ as zone N. For other curvatures, it will be apparent that the radius of zone N must correspond to the radius at the point of maximum curvature in zone N.

The curvature of belt 12 in loading zone L enables a desired arrangement of products P to be easily achieved in processing zone N. As shown in FIG. 2, products P are equally spaced along the collapsed length of belt 11 in four parallel paths (1), (2), (3) and (4). Of course, the products may also be placed across the belt in any desired or random spacing. Along infeed zone M, the spacing between the products on straight infeed sections of belts 11 and 12 in the respective paths incrementally increases from path (4) to path (1), but will replicate the spacing of loading zone L as belt 12 collapses into helical section 12c in processing zone N.

The products must be deposited in outer paths (2) (3) and (4) with incrementally greater frequencies than in inner path (1) to maintain equal spacing due to the higher tangential velocities. In the manual mode of loading products, a worker can accomplish this visually within acceptable deviations. On the other hand, it would be virtually impossible for a worker to load products at precise intervals along plural paths of a conventional straight infeed belt to achieve equal spacing where the belt collapses in a helical processing zone N. Instead, the products would be deposited in all paths with more space than is needed in the processing zone N in order to compensate for the greatest reduction or collapse of the belt occurring at innermost path. Space in the outer paths is therefore wasted and belt capacity is not fully utilized.

The increase in production obtained for products equally spaced according to the invention on a curved loading zone over products equally spaced by prior art technique on a straight loading zone is demonstrated by the following simplified comparison of products placed in four discrete columns. The production rate $Q_c$ utilizing the curved loading zone N of FIG. 2, is defined by the equation $$Q_c = VD\left(\frac{R_1 + R_2 + R_3 + R_4}{R_o}\right) \quad (1)$$

where:
V = uncollapsed belt speed;
D = loading density, pieces/unit length;
$R_1$, $R_2$, $R_3$, and $R_4$ = radii of paths (1), (2), (3) and (4); and
$R_o$ = outside radius of the belt.

If, for example, V = 8 ft./min., D = 2 pieces/paths foot, $R_1$, $R_2$, $R_3$, and $R_4$ = 80, 85, 90 and 95 inches respectively, and $R_o$ = 100 inches, then the production rate $Q_c$ is:

$$Q_c = (8)(2)\left(\frac{80 + 85 + 90 + 95}{100}\right) = 56.0 \text{ pieces/minute.}$$

If, according to the prior art method, the loading zone were straight and the products were placed in four paths with linearly equal spacing, the production rate $Q_s$ would be:

$$Q_s = VD\left(\frac{nR_1}{R_o}\right) \quad (2)$$

There being four paths (n=4) in the example, then the production rate $Q_s$ is:

$$Q_s = (8)(2)\left[\frac{(4)(80)}{100}\right] = 51.2 \text{ pieces/minute.}$$

The improvement in loading, according to the method and apparatus of FIGS. 1 and 2 is therefore:

$$\left(\frac{Q_c - Q_s}{Q_s}\right)100 = \left(\frac{56.0 - 51.6}{51.6}\right)100 = 8.5\%$$

It will be noted that the improvement would be even greater with more paths.

Figure 3:
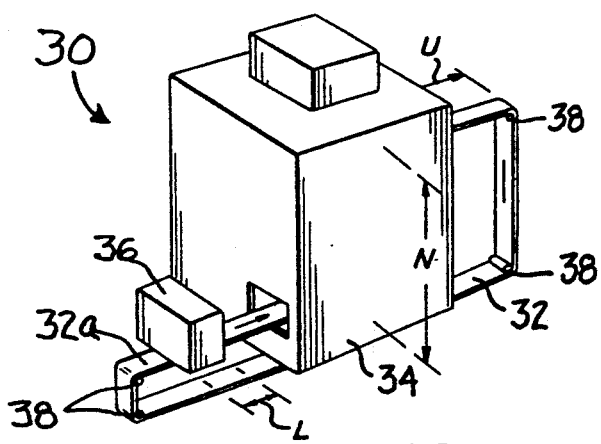
FIG. 3 is a schematic view in perspective of another embodiment of a helical conveyor system according to the invention with integral infeed and collapsible belt sections suitable for automatically loading products in a processor.

FIG. 3 illustrates another embodiment of a processing system 30 including a single endless collapsible conveyor belt 32 for conveying paths of products through a chamber 34 similar to chamber 14 of FIG. 1. Products deposited by an automatic loader 36 on an integral infeed section 32a of belt 32 in straight loading zone L travel in a direction indicated by the arrows through a helical section (not shown) in processing zone N in chamber 34 and exit at an off-load zone U. Guide rollers 38 route belt 32 back to loading zone L. System 30 may also comprise an infeed belt separate from a collapsible belt-like system 10 above.

Figure 4:
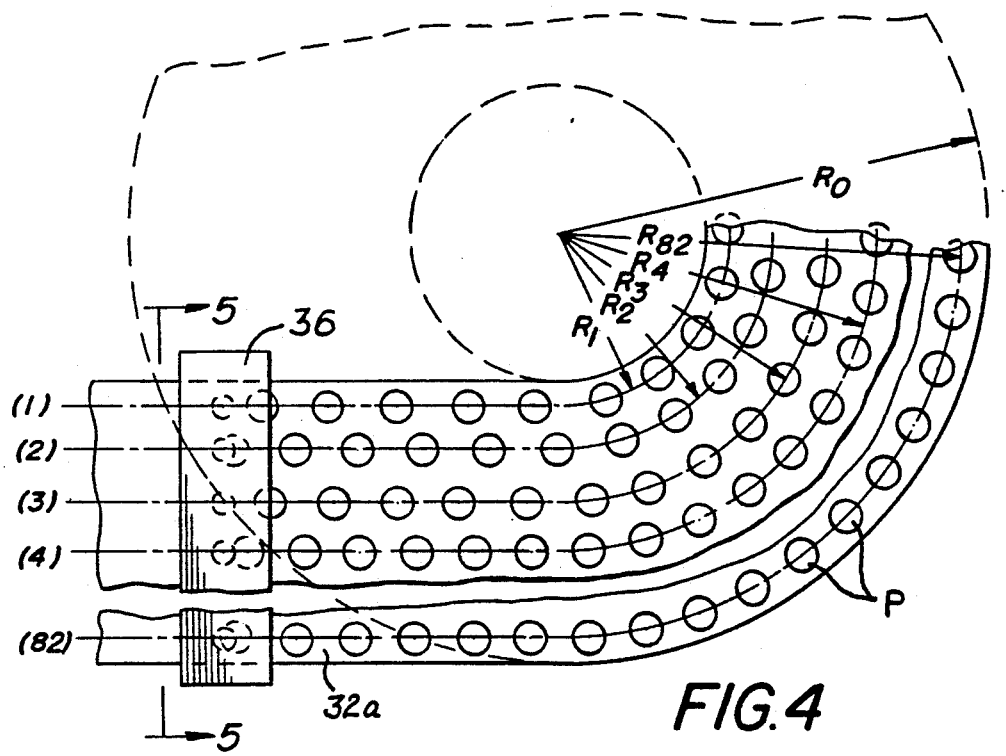
FIG. 4 is a plan view of fragmentary sections of the infeed and collapsible belt sections of FIG. 3 in different zones of the conveyor system with products placed according to the invention.

In the example of FIG. 4, there are 82 paths of products P deposited by loader 36 located above a straight infeed belt section 32a in loading zone L. The products are automatically deposited in paths (1) to (82) at incrementally discrete spacings, path (82) having the least spacing. However, where belt 32 collapses in processing zone N, the linear spacing between each product in the different paths is equal to the spacing in path (82), thus achieving maximum loading capacity of the belt in the processing zone N.

Figure 5:
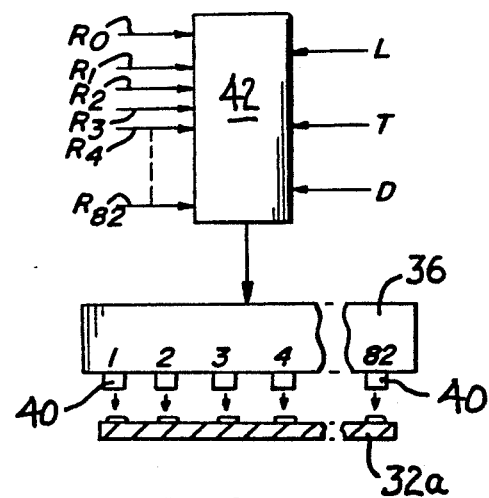
FIG. 5 is a schematic representation of a product dispenser according to the invention in a loading zone of the conveyor system taken along the line 5—5 of FIG. 4.

Referring to FIG. 5, loader 36 comprises a plurality of outlets 40 positioned across the width of belt section 32a for discharging products P along paths (1)–(82). Of course, it is understood that other forms of loaders may be used without departing from the spirit and scope of the invention. A controller 42 regulates the dispensing or production rate $Q_n$ for each path in response to inputs of the belt length L, load density D, processing time T, and the radii $R_1$, $R_2$... $R_n$ of the paths and the outside radius $R_o$ of the belt in the helix according to the following equation:

$$Q = VD\left(\frac{R_n}{R_o}\right) \tag{3}$$

For example, if V=23.456 ft./min., D=2⅔ pieces/foot, $R_1$=111.25 inches, and $R_o$=160 inches, the production rate $Q_1$ for path (1) is $$Q_1 = (23.456)(2\ 2/3)\left(\frac{111.25}{160}\right) = 43.5 \text{ pieces/minute.}$$

The total production rate $Q_T$ for 82 paths, nominally 0.586 inches apart, is:

$$Q_T = Q_1 + Q_2 + \ldots Q_{82}$$
$$= 43.5 + 43.7 + \ldots 62.1 = 4327.9$$

If the products were deposited according to the prior art method at the same rate in each of the 82 paths, the total production rate $Q'_T$ would be:

$$Q'_T = nQ_1$$

$$Q'_T = 82(43.5) = 3583.4 \text{ pieces/min.}$$

The improvement according to the method and apparatus of FIGS. 3-5 is therefore $$\frac{Q_T - Q_T}{Q_T}(100) = \left(\frac{4327.9 - 3583.4}{3583}\right)100 = 21.4\%$$

Thus, it can be seen that the collapsible belt capacity is more fully utilized by loading the belt on an infeed zone which curves in a direction and an amount corresponding to the curvature and radius of the helical zone, or by increasing the loading rate at each outlet 40 an amount sufficient to maintain a minimum product spacing in each path within the helical zone.

Some of the many advantages of the invention should now be readily apparent. It is now possible to maximize with greater ease helical belt loading at the infeed zone of an endless collapsible conveyor belt. In one embodiment, for example, a curved loading zone in the belt enables a worker to visually place the products at equally spaced close intervals which will replicate when the belt passes through the helical processing zone. Alternatively, an automatic dispensing system determines the spacing required and deposits products on a straight infeed zone of the belt accordingly in order to produce equally spaced products within the helical processing zone.

It will be understood that various changes in the details, steps and arrangement of parts, which have been herein described and illustrated in order to explain the nature of the invention, may be made by those skilled in the art within the principle and scope of the invention as expressed in the appended claims.

I claim:

1. In a belt conveyor system for advancing articles on a collapsible belt, the belt having a laterally curved path, the improvement comprising:
    loading means disposed upstream of the curved path for arranging the articles on the belt at preselected lengthwise intervals for causing the articles to be placed in equal intervals as the articles move through the curved path.

2. The improvement according to claim 1 wherein said loading means includes:
    guide means for curving the belt laterally in a direction and radius corresponding to the curvature of the path for receiving the articles on the belt at equal lengthwise intervals.

3. The improvement according to claim 1 wherein said loading means includes:
    dispenser means for depositing the articles on the belt at a predetermined rate as a function of the peripheral belt speed V, loading density D, and the ratio of the path radius $R_n$ to the peripheral belt radius $R_o$.

4. The improvement according to claim 3 wherein said dispenser means includes a controller for regulating the rate according to the following equation:

$$Q = VD\left(\frac{R_n}{R_o}\right)$$

5. A conveyor belt system for transporting paths of articles through a processor comprising:
    a collapsible endless belt formed into a helical section having at least one curved path within the processor, said belt having a predetermined peripheral speed in the processor, and an infeed section at the inlet to the processor; and
    loading means disposed at said infeed section for arranging the articles in each path on the belt at preselected lengthwise intervals to cause the articles to be placed in equal intervals as the articles move through the curved path.

6. A conveyor belt system according to claim 5 wherein said loading means includes:
    guide means for curving the belt laterally in a direction and radius corresponding to the curvature of the path for enabling the articles to be placed on said belt at equal intervals.

7. A conveyor belt system according to claim 5 wherein said loading means includes:
    dispenser means for depositing the articles in each path at a predetermined rate as a function of the peripheral belt speed V, loading density D in each stream, and the ratio of the path radius $R_n$ to the peripheral belt radius $R_o$.

8. A conveyor belt system according to claim 7 wherein said dispenser means includes a controller for regulating the predetermined deposit rate according to the following equation:

$$Q = VD\left(\frac{R_n}{R_o}\right)$$

9. A method for increasing load capacity in a curved path of a collapsible endless belt moving at a selected peripheral speed comprising:
   loading a plurality of paths of articles at predetermined intervals on a section of the belt upstream of the curved path; and
   conveying the articles through the curved path;
   whereby the predetermined intervals cause the articles on the belt paths to be placed at equal intervals as they advance in the curved path.

10. A method according to claim 9 wherein the belt section is curved upstream laterally in a direction and radius corresponding to the curved path, and the articles in said plurality of paths are deposited at equal intervals.

11. A method according to claim 9 wherein the loading step includes the step of:
   depositing the articles in each path at a preselected rate determined as a function of the peripheral belt speed V, loading density D in each path, and the ratio of the path radius $R_n$ to the peripheral belt radius $R_o$.

12. A method according to claim 11 further comprising:
   computing the preselected rate according to the following equation:

$$Q = VD\left(\frac{R_n}{R_o}\right)$$

13. A method for increasing the load capacity in a processor utilizing a collapsible belt formed into a helical path having a peripheral speed, comprising the steps of:
   arranging a plurality of paths of articles on an infeed section of the belt at preselected spaced intervals; and
   advancing the belt through the processor so that the spaced intervals on the infeed section provide equal spacing intervals in the helical path.

14. A method according to claim 13 wherein the infeed section is curved laterally in a direction and radius corresponding to the path, and the articles in said paths are deposited at equally spaced intervals.

15. A method according to claim 13 wherein the arranging step includes the step of:
   depositing the articles in each path at the preselected rate determined as a function of the peripheral belt speed V, loading density D in each path, and the ratio of the path radius $R_n$ to the peripheral belt radius $R_o$.

16. A method according to claim 15 further comprising: computing the preselected rate according to the following equation:

$$Q = VD\left(\frac{R_n}{R_o}\right)$$

* * * * *